UNITED STATES PATENT OFFICE.

AUGUSTUS JAMIESON, OF PRINCETON, ILLINOIS.

IMPROVEMENT IN FIRE AND WEATHER PROOF COMPOSITIONS.

Specification forming part of Letters Patent No. 194,916, dated September 4, 1877; application filed March 7, 1877.

*To all whom it may concern:*

Be it known that I, AUGUSTUS JAMIESON, of Princeton, in the county of Bureau and State of Illinois, have invented a new and useful Improvement in Fire and Weather Proof Compositions; and I do hereby declare that the following is a full and exact description of the same.

The object of my invention is the production of a fire and weather proof composition which will combine the incombustible properties of silicate of soda and the indestructible properties of glass, designed to be used for coating the portions of a building exposed to the weather, or all of the wood-work of the same, when it is desired to make it fire-proof, or for use upon any article or structure which is designed to be protected against the effects of the weather or of fire.

My invention therein consists in the composition composed of the ingredients, and prepared in substantially the manner, hereinafter explained.

In the manufacture of my composition I take of silicate of soda, in solution, twenty (20) ounces; of sulphate of zinc, one (1) ounce; and of aqua-ammonia, two (2) ounces. The sulphate of zinc is first dissolved in two ounces of water, and to the solution is added one ounce of the aqua-ammonia, forming, as a precipitate, oxide of zinc. The liquid is poured off from the precipitate, and this precipitate is then dissolved in the remaining one ounce of aqua-ammonia. To this solution is added the silicate of soda, and the preparation is then ready for use.

A composition is thus formed which will render any article to which it is applied fire and weather proof, at a small expense.

I have designed to apply this composition in any convenient manner, either coating the article by means of a brush or otherwise, or immersing the same in a bath of the solution.

In this composition the ammonia serves to keep the preparation soluble so long as it is in bulk; but when the composition is applied the ammonia evaporates and the oxide of zinc and the silicate of soda unite, forming an insoluble double silicate of soda and oxide of zinc, thus producing a true glass.

This double silicate is absolutely insoluble in either hot or cold water, being a great improvement over silicate of soda alone, which is quite soluble in cold water and very soluble in warm water.

The composition, when applied, gives to the article all the incombustible properties of silicate of soda and, at the same time, makes it as indestructible under the effects of the weather as glass.

Having thus fully described my invention, what I claim as new, and desire to secure by Letters Patent, is—

The composition described, consisting of silicate of soda, oxide of zinc, and aqua-ammonia, prepared in about the proportions and manner described.

This specification signed and witnessed this 19th day of January, 1877.

AUGUSTUS JAMIESON.

Witnesses:
H. M. TRIMBLE,
C. D. STEELE.